Nov. 15, 1966 S. M. STEIN 3,285,795

HEAT CURABLE PLASTIC SHEETS AND LAMINATES

Filed June 18, 1962 6 Sheets-Sheet 1

INVENTOR:
STEFAN M. STEIN

INVENTOR:
STEFAN M. STEIN

Nov. 15, 1966  S. M. STEIN  3,285,795
HEAT CURABLE PLASTIC SHEETS AND LAMINATES
Filed June 18, 1962  6 Sheets-Sheet 4
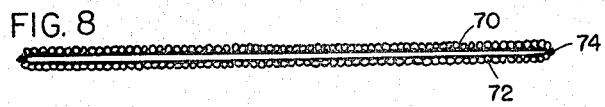
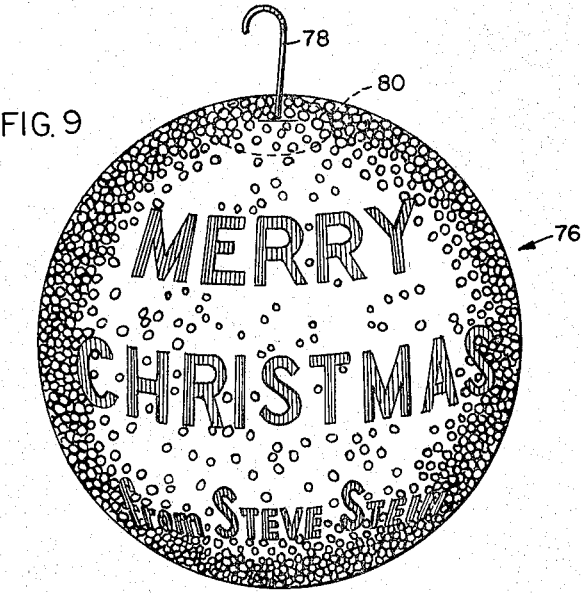
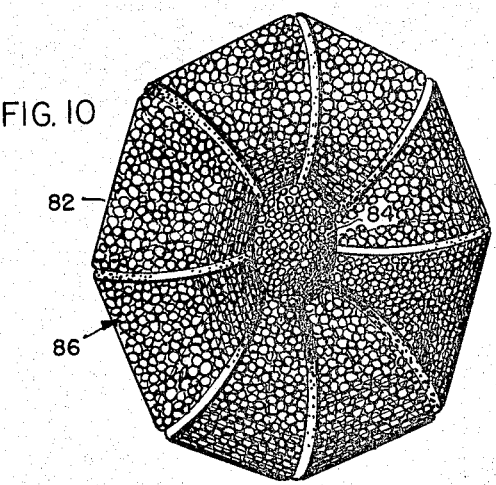
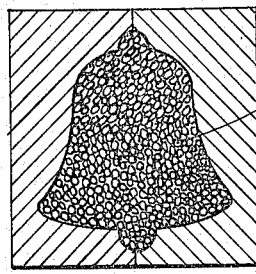
INVENTOR:
STEFAN M. STEIN

INVENTOR:
STEFAN M. STEIN

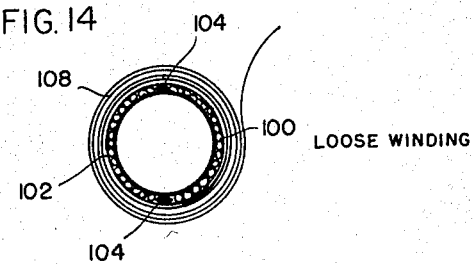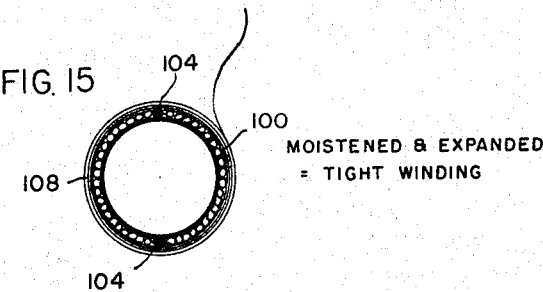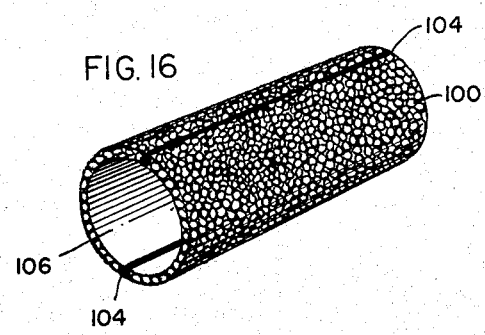

3,285,795
HEAT CURABLE PLASTIC SHEETS AND LAMINATES
Stefan M. Stein, 6150 N. Winthrop, Chicago, Ill.
Filed June 18, 1962, Ser. No. 203,238
5 Claims. (Cl. 161—7)

This invention relates to a novel plastic sheet, to its methods of manufacture and to articles and devices produced therefrom. More particularly, this invention relates to sheet material formed of two layers, one of an expandable polymeric substance and the other of a substance which is substantially unexpandable or less expandable than said first layer. Upon subjection to expansion conditions, the sheet curls upon itself with the unexpandable or less expandable layer on the inside. Such automatic curling makes the sheet extremely useful for a variety of articles and devices as will be described in more detail below.

It is now customary to extrude sheet using expandable polymeric substance, such as expandable polystyrene, polyethylene, polyurethane, polyvinylidene chloride, polyvinyl chloride, and the like. In such extrusion of sheet, the substance is almost completely expanded due to the heat of extrusion. Very attractive uniformly expanded sheet material is produced. And while some post-expansion may still be possible, it is insufficient or too uniform to effect certain unique characteristics of the sheet of this invention as described hereinafter.

An object of this invention is to provide novel plastic sheet material.

Another object of this invention is to provide sheet material which will curl automatically when subjected to certain activation conditions.

Still another object is to provide novel sheet material which, when assembled in a particular manner, will produce a device which "puffs" into a hollow structure automatically upon subjection to certain activation conditions.

A further object is to provide several novel processes for making said novel sheet material.

A still further object is to provide novel decorative or ornamental devices.

Another object is to provide a novel greeting card.

Another object is to provide a novel method for producing said decorative devices particularly said greeting card.

Another object is to provide novel insulation material and a method for its production, shipment and use.

Still another object is to provide novel cushioning material and a method for its production and use.

Another object is to provide a novel hair curler, a method for its manufacture and a method for its use.

Other objects of the invention will in part be obvious and will in part appear hereinafter.

The invention accordingly comprises the several steps and the relation of one or more of such steps with respect to each of the others, the apparatus embodying features of construction, combinations and arrangements of parts which are adapted to effect such steps, and articles which possess the characteristics, properties and relation of elements, all as exemplified in the detailed disclosure hereinafter set forth, and the scope of the invention will be indicated in the claims.

It has now been found that when an expandable polymeric substance; such as expandable polystyrene, polyethylene, polyurethane, polyvinylidene chloride, polyvinyl chloride or the like, is formed into two layered sheets, wherein one layer is substantially unexpandable or expandable at a slower rate by reason of fusing or by reason of the use of an unexpandable base sheet, and the other layer is expandable, subsequent exposure to expansion conditions will cause the sheet to curl upon itself with the unexpandable side in.

Such curling is particularly useful in certain articles and devices. For example, by heat sealing or otherwise securing two sheets of this material together, with the unexpandable layers facing each other, hollow structures can be formed by simply subjecting said assembly to conditions which expand the plastic substance.

If the heat seal assembly is formed with a square, rectangular, elliptical or circular rim configuration, and the entire rim edge heat sealed, upon expansion, a hollow square, rectangular, ellipsoidal or globular structure respectively will be formed. If the heat sealing is limited to only two opposite edges of the square or rectangular configuration, a tubular structure will result. And if interrupted heat sealing is utilized, on configurations, such as an ornamental flat bow, other hollow configurations will result. Thus, depending upon size, these hollow structures may be used for insulation, cushioning or decorative devices in advertising or greeting card use. Indeed, the sheet material has use in many packaging embodiments where a curved insulated side wall is desired.

A typical instance of use as a decorative device, is in Christmas greeting cards. Here, two square or circular sheets of similar size are heat sealed together with the unexpandable layers on the inside of the assembly. A Christmas greeting is then imprinted on one outside surface. In this flat condition, it may be sent through the mail. Upon receipt, the recipient would, by separate insert, be instructed to drop the card into hot, preferably boiling water. With such treatment, the card will expand or "puff" into a pillow or snow ball. The Christmas greeting remains on the outside. This pillow or snowball is then hung on the recipient's Christmas tree as a tree ornament or else, a hole is pierced into its wall and slipped over a light bulb on the tree. A very attractive glow pillow or snowball is thereby created. Thus, such cards attain a usefulness to the recipient and if imprinted with the sender's name, attains the status of a very personal greeting visible to all.

There are several methods used for forming the novel sheet of this invention, but, in essence, each involves formation of a two-layered sheet with one layer unexpandable or substantially unexpandable and the other capable of being expanded. Such a sheet may be formed by the momentary application of fusing heat to one side of a spread layer of the expandable plastic substance or else an expandable substance may be adhered to a solvent softened or adhesive coated web, preferably of similar substance, but unexpandable.

In the fusing technique, the expandable plastic substance, preferably as a beaded, pelleted or particulated material is dispensed from a hopper, in spread form, onto a heated roll where the heat of the roll is sufficient to almost instantaneously fuse the beads, pellets or particles together but only via the adjacent contacting layer which comes in direct contact with the roll. Such a fusing technique causes the formation of sheet with negligible expansion of the expandable plastic substance.

The sheet is removed from the roll by the use of a doctor knife or by merely pulling the sheet from the roll via tension from a windup roll. In the latter instance, the surface of the roll is constructed of a non-adherent material; such as Teflon (a polyfluoroethylene polymer manufactured by E. I. Du Pont de Nemours Company of Wilmington, Delaware), of polished chrome. After the sheet is removed from the heated roll, it is cooled, and wound upon a windup roll.

Sheet, so formed, is substantially flat and displays a two-layered structure. One layer or face has a fairly smooth fused appearance while the other layer or face has a speckled appearance characteristic of the beaded or particulate material originally used to form the sheet. Some negligible expansion of each individual bead or particle may have occurred but most of the expansion will still occur when the sheet is subjected to expansion conditions.

In another sheet forming technique, one side of a web, preferably of similar plastic substance (although paper, cellophane, plastic sheeting, etc., may also be used) but not expandable to any substantial extent or, if expandable, is expandable at a slower rate, is made adherent; such as by solvent softening, by heat or by application of adhesive. An expandable plastic material, preferably in bead or particle form, is spread upon the adherent side and made integral therewith. Sheet, so formed, is also two-layered and has a smooth side and a beaded or pebbly side. When this sheet is subjected to expansion conditions, such as by insertion into hot boiling water, its expandable layer expands and exerts a force against the unexpandable layer and causes the sheet to curl upon itself with the unexpandable layer on the inside.

For a fuller understanding of the nature and objects of the invention, reference should be had to the following detailed description taken in connection with the accompanying drawings in which:

FIG. 8 is a side cross-sectional view of a plastic device formed by securing two sheets together at their rim portions;

FIG. 9 is a perspective view of a similar device as shown in FIG. 8 but utilized as a Christmas greeting card and after being subjected to expansion conditions;

FIG. 10 is a perspective view of an ornamental bow made by using the novel sheet of this invention and then expanding it;

FIG. 11 is a top view of another ornamental embodiment of the plastic device of this invention;

FIGS. 14, 15 and 16 illustrate the use of a tubular configuration formed of the sheet of this invtntion as a self-expanding hair curler.

Similar reference characters refer to similar parts throughout the several views of the drawing.

Figure 1:
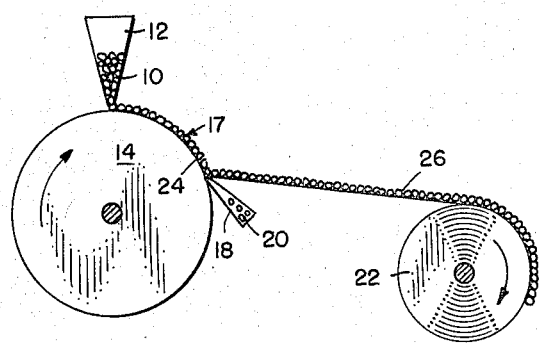
FIG. 1 is a cross-sectional side view of one embodiment of apparatus used for making the novel sheet of this invention.
Figure 2:
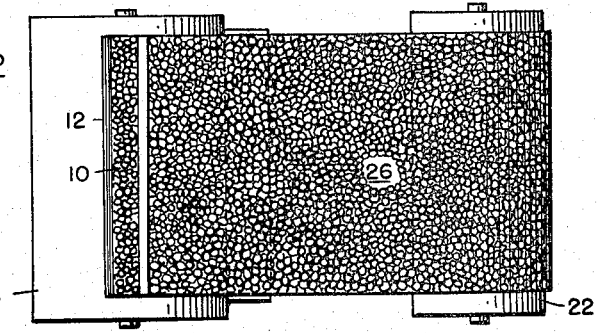
FIG. 2 is a top view of the apparatus of FIG. 1.

As indicated in FIGS. 1 to 4 of the drawing, the novel sheet of this invention can be formed by a fusing technique which involved spreading expandable plastic substance into sheet form and then momentarily applying sufficient heat to one side of the spread substance to fuse the adjacent layer into sheet form without causing any substantial expansion. This is best accomplished by dispensing the plastic substance, indicated as 10 from a hopper 12 onto a rotating heated casting roll 14. The speed of rotation of the roll is adjustable.

Figure 3:
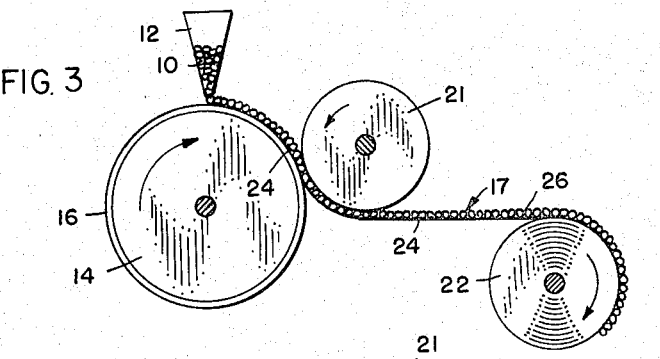
FIG. 3 is a cross-sectional side view of another embodiment of apparatus used for making the novel sheet.
Figure 4:
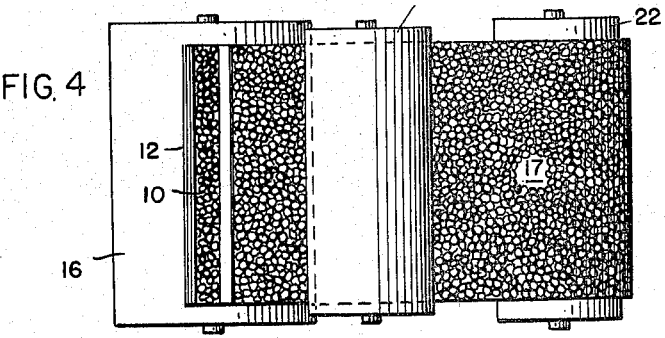
FIG. 4 is a top view of the apparatus of FIG. 3.

In the embodiment of a casting roll shown in FIG. 1, the surface of roll 14 has no particular provision for non-adherency of the deposited plastic material other than being smooth. In FIG. 3, the roll is shown as having a Teflon coating 16, which is non-adherent. Alternatively, a polished chrome surface may be used as a non-adhering surface.

Roll 14 has provision for internal heating so that its surface will, upon contact with the dispensed plastic material, melt the adjacent contacting layer 24 and fuse the particles together into a sheet 17.

Typical temperature ranges for use of various expandable plastic materials are indicated in Table 1.

*Table 1*

| | Degrees Fahrenheit |
|---|---|
| Polystyrene | 200–250 |
| Polyethylene | 250–350 |
| Polyurethane | 250–400 |
| Polyvinylidene chloride | 220–400 |
| Polyvinyl chloride | 320–350 |

The sheet surface 26 removed from the roll surface will be substantially unaffected so that a two-layered sheet will have been formed. Since the application of heat was only of momentary duration, very little expansion, if any, of the expandable plastic substance will have occurred.

To remove the sheet from roll 14, the apparatus of FIG. 1 utilizes a knife 18 which is preferably cooled by liquid flowing through coils 20 within the knife body.

In FIG. 3, no knife is required because surface 16 of roll 14 is non-adherent. Instead, a chill roll 21 is utilized to guide and to instantly chill the sheet as it is pulled off the casting roll 14. The sheet is then wound onto a wind-up roll 22.

As illustrated (FIG. 3) the finished sheet 17 has a lower continuous surface 24. The top surface may be fairly discontinuous; that is, of a speckled appearance duplicating, to a substantial extent, the appearance of the plastic particles when first spread into sheet form. The body of the sheet contains plastic substance which is substantially unexpanded. Thus, by subjecting the sheet to expansion conditions, the expansion of the sheet, in depth, width and length will occur. During such expansion, the fused side 24, for some reason either resists or retards the expansion to a greater extent than the unfused side 26. Thus, curling of the sheet, with the fused face in, occurs. Such curling is particularly useful for forming hollow plastic devices such as indicated below. Indeed, the single sheet is quite attractive as is and may be used as display material.

Figure 5:
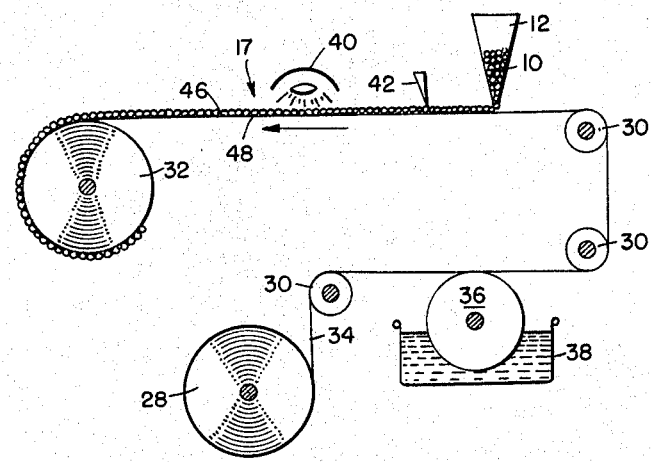
FIG. 5 is a side cross-sectional view of a third embodiment of apparatus used for making the novel sheet.
Figure 6:
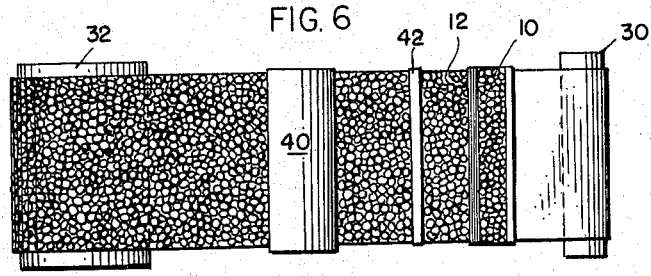
FIG. 6 is a top view of the apparatus of FIG. 5.

IN FIGS. 5 and 6, apparatus is shown wherein the expandable plastic substance is adhered to a base which is preferably of the same plastic substance, but which is substantially unexpandable. The apparatus consists of a supply roll 28, several guide rolls 30 and a wind-up roll 32. The supply roll supplies the base web, 34, preferably of the same plastic substance as the expandable plastic to be adhered thereto. The base web passes over an applicator roll 36 which applies either solvent or adhesive to the web from pan 38. The solvent softens the web while the adhesive acts as adherent so that one side of the base web will be receptive to the expandable plastic substance 10 when applied thereto. The latter is supplied, preferably in beaded form, from hopper 12. A doctor knife 42 removes excess substance. Drying means such as an infra red lamp 40 cures the adhesive or else dries the solvent. The resultant two layered sheet 17 has a beaded surface 46 and a solid web surface 48.

Figure 7:
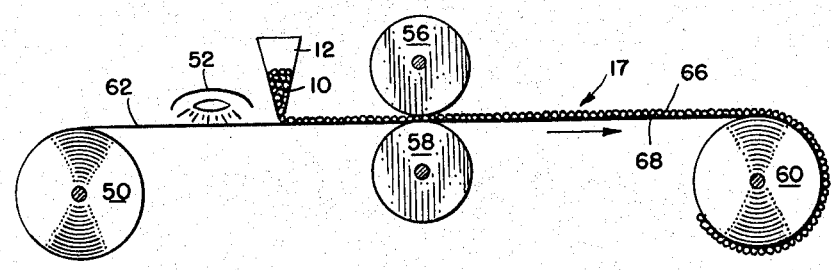
FIG. 7 is a side cross-sectional view of a fourth embodiment of apparatus used for making the novel sheet.

In FIG. 7, still another embodiment of apparatus is shown. It consists of a supply roll 50, a heater 52, a hopper 12, two press rolls 56 and 58 and a wind-up roll 60. Base web 62 is fed from the supply roll 50, under heater 52 to cause surface melting of the web and then immediately passes under hopper 12 which supplies expandable plastic substance 10, preferably in bead form, to the softened surface of the web. Press rolls 56 and 58 press the beads into the softened surface. Upon cooling of the substance, the substance adheres to the web and an integral two layered sheet 17 with a beaded surface 66 and a solid web surface 68 results.

In both instances, the two layered sheet when subjected to expansion conditions, will curl upon itself with the solid webbed surface 48 and 68 respectively on the inside.

FIGS. 8 and 9 illustrate a usage of the material. Two sheets 70 and 72 are secured together as at 74, at their edges, with the fused or solid webbed side or layer on the inside. Heat sealing is one good fast method for securing the sheets together. However, use of solvent, glue or adhesive is also possible. The plastic device, so formed, retains its flat shape.

In this condition, it can be imprinted with a Christmas greeting (as in FIG. 9) or with advertising indicia and mailed while flat. As a card, it can be mailed in an envelope through the mails.

As a sealed assembly, it is capable of puffing itself into a ball (see FIG. 9) or pillow or ellipsoid when subjected to expansion conditions. Application of relatively moderate heat is generally the only requirement to expand expandable plastic material. Such heat may be from boiling water, steam, hot air or even a heat powder, which upon being moistened with water, generates sufficient heat to expand the material.

With respect to the temperature range necessary to cause expansion, this obviously varies with the plastic material being used. Table 2 illustrates typical temperature ranges for expanding the plastic material.

*Table 2*

|  | Degrees Fahrenheit |
|---|---|
| Polystyrene (Dylte manufactured by Koppers Company, Pittsburgh, Pa.) | 200–250 |
| Polyethylene | 250–350 |
| Polyurethane | 250–400 |
| Polyvinylidene chloride | 220–400 |
| Polyvinyl chloride | 320–350 |

In the Christmas card embodiment of a plastic device, the recipient is instructed, by a separate insert, to drop the card (see FIG. 8) into a pot of boiling water or to place it in an oven at about 200–210° F. This causes the card to puff or swell into a snowball 76, which with an appropriate hanger 78 can be hung onto recipient's tree as an ornament. The greeting on the card remains intact and a very personal useful card has been given by the sender to the recipient.

An alternative usage of the snowball Christmas card, is as a cover over a Christmas tree light. A hole 80 may be punctured into the ball 76 then placed over the light bulb. An attractive, pleasant glowing ball results. With proper selection of colored expandable plastic material or by judicious speckling with gold or silver spray of by selection of a colored light bulb, the glowing effect can be further highlighted.

FIG. 10 illustrates another usage of the sheet material of this invention. Stamping and limited heat sealing of certain specific edges of two sheets; such as at edges 82 and intermediate area 84, with subsequent expansion of the expandable plastic substance results in an ornamental bow 86. The bow is useful in packaging, display work, lighting, etc.

FIG. 11 illustrates usage of two sheets to form a sign. In the embodiment, two sheets are heat sealed together with an unsealed portion 87 (a bell) left in the center. Upon being subjected to heat, the bell expands and a hollow sign is created.

Figure 12:
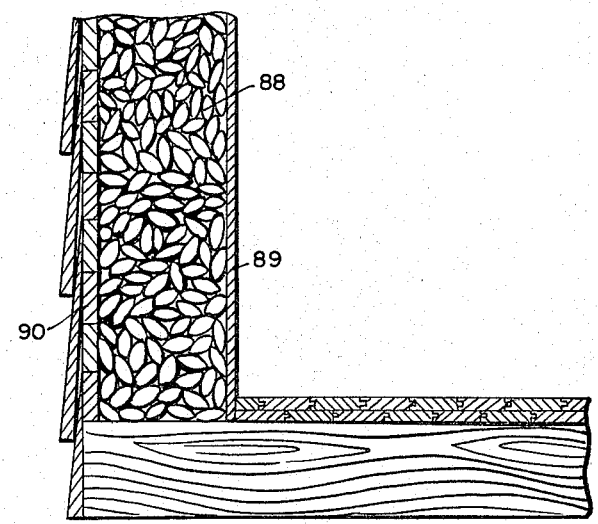
FIG. 12 is a side cross-sectional view of a hollow building wall with "pillows" formed of the novel sheet of this invention filling the space between the interior and exterior wall to act as insulation and sound adsorbing material.

FIG. 12 illustrates still another usage wherein relatively small "pillows" 88 are formed and used as insulation between the inner and outer walls 89 and 90 respectively of a building. Such use of "pillows" is advantageous over the currently used solid foamed slabs of plastic material by reason of the lesser use of plastic. The air to plastic ratio is substantially increased and with lesser plastic, a similar insulation factor is obtained.

In making such "pillows," one technique has been found to be most useful. It involves a setup wherein 2 continuous sheets are dispensed from supply rolls onto a heat sealing head. The fused or solid web layer of one faces the fused or solid web layer of the other sheet. The two continuous sheets are heat sealed together in a quilt-like pattern. the assembly is then cut into lengths and shipped as flat sheets.

At the site of use, each flat sheet is subjected to further cutting into small flat tables and then subjected to expansion conditions. Tiny puffed pillows results and these are deposited into the space in the wall. If expansion in situ is possible, the tables may be expanded after they have been deposited into the wall space.

It might be mentioned at this point that the larger sheets may be expanded into quilt-like blankets which are useful as sheet cushioning material. If properly plasticized so that a fairly soft and flexible quilt is obtained, the sheet is useful for rug cushioning, wrapping pads and the like.

Figure 13:
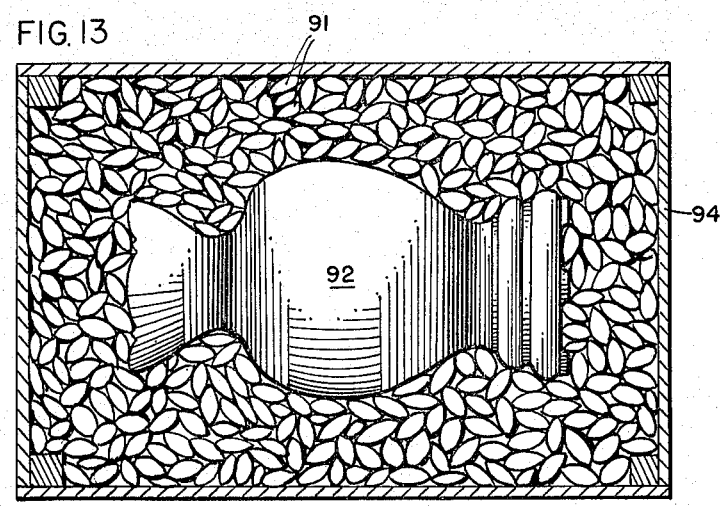
FIG. 13 is a pictorial view which illustrates the use of said "pillows" as packing and cushioning material.

FIG. 13 illustrates usage of the "pillow" form 91 as cushioning material for packaging a vase 92 in a wooden case 94. By proper selection of plastic with certain resiliency, and if possible, expansion in situ, each "pillow" 91 can be made to act as a close fitting pneumatic cushion for the article being shipped.

FIGS. 14, 15 and 16 illustrate use of the sheet of this invention wherein two strips 100 and 102 in arcuate form, are heat sealed; as at 104, on their opposing long edges. The fused or solid webbed sides face inwardly. The inside surface is coated with a heat generating chemical 106, such as disclosed in U.S. 2,183,587. The device is then used as a hair curler.

After a hair tress 108 has been wrapped on the curler, it is moistened. Such moistening causes the heat chemical to generate heat sufficient to cause expansion of the curler. This expansion causes tightening of the wrapped tress, which is very desirable in hair waving and curling operations.

It will thus be seen that the objects set forth above, among those made apparent from the preceding description, are efficiently attained and, since certain changes may be made in carrying out the above process, and the described product, and in the construction set forth without departing from the scope of this invention, it is intended that all matter contained in the above description as shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language might be said to fall therebetween.

Having described my invention, what I claim as new and desire to secure by Letters Patent is:

1. Ornamental polymeric sheet material formed solely of expandable pelleted polymeric substance wherein one side of said sheet has a fused web-like structure and the second side has a discrete pebble structure capable of expansion greater than the side with the fused web-like structure so that upon heating the sheet will curl due to the difference of expansion of each side.

2. An ornamental plastic device formed by joining at least two sheets of the sheet material set forth in claim 1 at the edges thereof with the pelletized surface of each on the outside, said arrangement being effective to provide a puffing action between the joined sheets when the device is heated.

3. A greeting card capable of being mailed as a flat card and also capable of being expanded into a hollow ornamental plastic device by the recipient comprising the plastic device of claim 2.

4. A process for forming ornamental polymeric sheet material formed solely of expandable pelleted polymeric substance wherein one side of said sheet has a fused web-like structure and the second side has a discrete pebble structure whereby curling of the sheet will occur upon its subsequent subjection to heat comprising spreading expandable pelleted polymer in contiguous relation onto a heated surface, said surface being sufficiently hot to fuse the pellets into said sheet.

5. The process of claim 4 wherein said sheet is subsequently subjected to heat to cause curling.

References Cited by the Examiner

UNITED STATES PATENTS

| | | | |
|---|---|---|---|
| 2,183,587 | 12/1939 | Racen et al. | 44—3.1 |
| 2,439,815 | 4/1948 | Sisson | 161—173 X |
| 2,649,958 | 8/1953 | Rausch | 206—46 |
| 2,745,141 | 5/1956 | Brennan | 18—57 |
| 2,827,727 | 3/1958 | Lipsius | 41—24 |
| 2,862,834 | 12/1958 | Hiler | 117—41 |
| 2,878,153 | 3/1959 | Hacklander. | |
| 2,920,977 | 1/1960 | Adams | 117—15 |
| 2,962,407 | 11/1960 | Aykanian | 18—53 X |
| 2,979,246 | 4/1961 | Liebeskind | 229—14 |
| 2,994,327 | 8/1961 | Otto et al. | 132—39 |
| 3,037,897 | 6/1962 | Pelley | 156—78 |
| 3,054,146 | 9/1962 | Griffen | 264—321 X |

OTHER REFERENCES

Koppers Co., Inc., "Dylite Expandable Polystyrene," p. 18, Figure 6 relied on; published by Koppers Co., Pittsburgh, Pa.

National Patent Council, "Invention News," May–June 1951, Gary, Indiana.

ALEXANDER WYMAN, *Primary Examiner.*

J. T. PIRKEY, J. STEINBERG, *Assistant Examiner.*